United States Patent

Root

[11] Patent Number: 5,919,562
[45] Date of Patent: Jul. 6, 1999

[54] REPOSITIONABLE MOUSE PAD

[75] Inventor: Donald Root, Seattle, Wash.

[73] Assignee: GM Nameplate, Inc., Seattle, Wash.

[21] Appl. No.: 09/170,857

[22] Filed: Oct. 13, 1998

[51] Int. Cl.[6] .............................. C09J 7/00; G06K 11/18
[52] U.S. Cl. .................................. 428/343; 428/355 RA; 428/350; 345/156
[58] Field of Search .................................. 428/40.1, 41.5, 428/41.8, 42.1, 350, 343, 352, 355; 345/156

[56] References Cited

U.S. PATENT DOCUMENTS

| | | | |
|---|---|---|---|
| 3,691,140 | 9/1972 | Silver . | |
| 3,737,816 | 6/1973 | Swasey | 161/167 |
| 3,924,043 | 12/1975 | Gorbran et al. | 442/151 |
| 5,141,790 | 8/1992 | Calhoun et al. | 428/40 |
| 5,234,740 | 8/1993 | Reeves et al. | 428/156 |
| 5,508,084 | 4/1996 | Reeves et al. | 428/172 |
| 5,622,168 | 4/1997 | Keusch et al. | 128/640 |
| 5,776,585 | 7/1998 | Fukuhara et al. | 428/141 |
| 5,788,203 | 8/1998 | Nitti | 248/346.01 |
| 5,820,968 | 10/1998 | Kurani | 428/137 |

*Primary Examiner*—Jenna Davis
*Assistant Examiner*—Arti R. Singh
*Attorney, Agent, or Firm*—Christensen O'Connor Johnson & Kindness PLLC

[57] ABSTRACT

A repositionable mouse pad (20) for a computer having an input device (30) operatively connected to the computer. The mouse pad includes a tracking surface (22) having upper and lower surfaces (26) and (28). The upper surface being textured for precise tracking of the pointing device. The mouse pad also includes an attachment member (24) bonded on the lower surface of the tracking surface and includes an adhesive (34). The attachment member is bonded to the lower surface of the tracking surface such that the adhesive side faces outwardly away from the tracking surface. The adhesive side is renewable to restore its adhesive strength by cleaning the adhesive side.

9 Claims, 1 Drawing Sheet

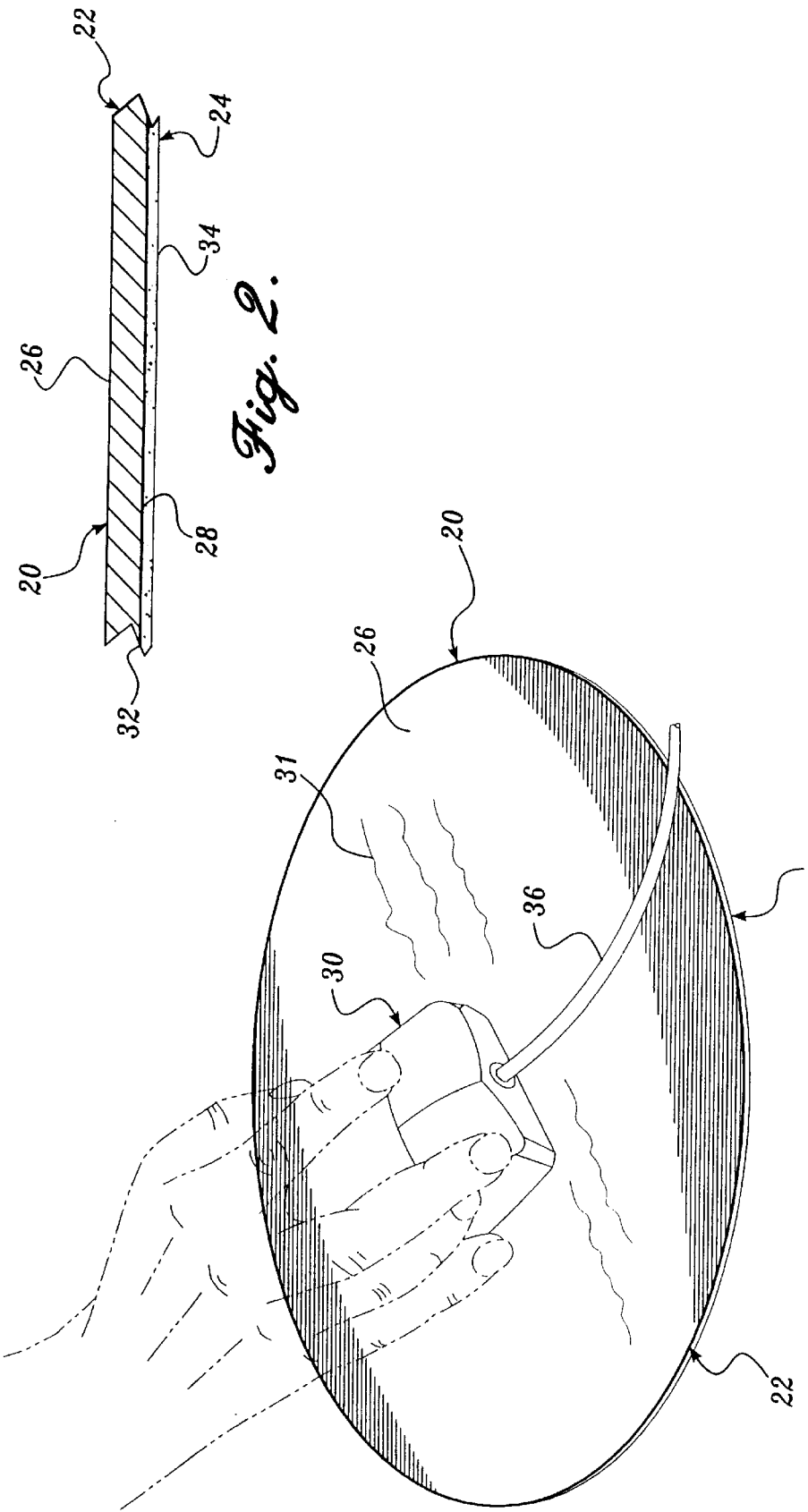

5,919,562

REPOSITIONABLE MOUSE PAD

FIELD OF THE INVENTION

The present invention relates generally to a computer mouse pad and, in particular, to a computer mouse pad having a renewable adhesive bonded to one side of the mouse pad.

BACKGROUND OF THE INVENTION

Most computers have an input device, commonly known as a mouse, operatively connected to the computer. Such devices permit interactive operation of the computer. In particular, the input device permits the computer operator to move a cursor located on the computer screen to perform a number of functions, such as opening software programs. Most input devices have a housing and a ball received within the housing. A portion of the ball is exposed to the exterior of the lower surface of the housing, such that it may roll along a mouse pad to track the cursor on the computer screen.

Mouse pads currently available include a sheet of plastic having an upper surface that is textured to provide frictional resistance to the rolling ball of the input device. The sheet of plastic is adhesively bonded to an underlying thin layer of flexible foam material. The foam material has a high friction coefficient so that it will not readily slide on a table or desk surface. Although such mouse pads are effective at providing a convenient frictional resistance to the rolling ball of an input device, they are not without their problems.

One such problem is that frictional resistance of the foam material eventually deteriorates. This results in a mouse pad that may slide across the top of the desk or table during use. Additionally, because the frictional resistance of the foam deteriorates, most mouse pads also have a relatively short useful life. Another problem associated with currently available mouse pads is their expense. Because mouse pads are manufactured with a layer of foam, they have an unnecessary incremental cost, therefore, it is desirable to eliminate the foam layer.

Thus, there exists a need for a relatively simple and inexpensive mouse pad for computers. The present invention addresses these and related issues to overcome the limitations of mouse pads currently available.

SUMMARY OF THE INVENTION

In accordance with the present invention, a repositionable mouse pad for a computer is provided. The mouse pad includes a first layer having a textured first side and a second side. The mouse pad also includes an attachment layer having an adhesive side. The attachment layer is bonded to the second side of the first layer, such that the adhesive side faces outwardly away from the first layer. The adhesive side has a predetermined adhesive strength to permit the mouse pad to be releasably attached to a surface. The adhesive side is renewable to restore its adhesive strength by cleaning the adhesive side.

In accordance with other aspects of this invention, the attachment layer is a layer of normally tacky and pressure-sensitive adhesive.

In accordance with yet other aspects of this invention, the adhesive strength may be restored by washing the adhesive in water to restore its tackiness.

In accordance with still other aspects of this invention, the mouse pad further includes an input device operatively connected to the computer. The input device includes a housing and a ball disposed within the housing. The ball of the input device rolls over the textured first side of the first layer for precise tracking of the input device.

In accordance with still yet other aspects of this invention, the computer mouse pad further includes indicia attached to the first side of the first layer for displaying a message. Additionally, the first layer is a flexible material.

A mouse pad formed in accordance with the present invention has several advantages over mouse pads currently available. First, because the adhesive of the mouse pad is renewable, it has a longer useful life. Second, the mouse pad of the present invention is less expensive than those currently available because it does not require a substrate, such as a layer of foam. Finally, because a mouse pad formed in accordance with the present invention is manufactured without a substrate, it is simpler to manufacture. Thus, the mouse pad of the present invention is cheaper, has a longer useful life, and is simpler to manufacture than those currently available.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 1 is an environmental view of a mouse pad formed in accordance with the present invention; and FIG. 2 is a cross-sectional view of a mouse pad formed in accordance with the present invention showing the adhesive layer and the tracking surface.

DETAILED DESCRIPTION OF THE PREFERRED EMBODIMENT

FIGS. 1 and 2 illustrate a preferred embodiment of a mouse pad 20 constructed in accordance with the present invention. The mouse pad 20 includes a flexible tracking surface 22 and an adhesive layer 24. The tracking surface 22 is preferably a flexible material, such as a sheet of polycarbonate material. The tracking surface 22 includes an upper surface 26 and a lower surface 28. The upper surface 26 is textured to provide a frictional rolling surface for an input device, such as a mouse 30. Textured, within the meaning of the present invention, includes not only a rough or grainy surface, but also a surface having a predetermined coefficient of friction to ensure precise tracking of the mouse 30. The upper surface 26 also includes indicia 31 disposed thereon for displaying a message.

The adhesive layer 24 is bonded to the lower surface 28 of the tracking surface 22. The adhesive layer 24 is preferably a sheet of pressure-sensitive adhesive material having a flexible backing sheet 32 and a layer of low-tack acrylic adhesive 34. Preferably, the adhesive layer 24 is a layer of adhesive double-coated film tape commonly known as Post-It™ adhesive sold by The 3M Company. More specifically, the adhesive layer 24 is sold by The 3M Company under the adhesive description of 9415. Preferably, the adhesive layer 24 is carbocyclic alkyl acrylates and vinyl esters, as is disclosed in U.S. Pat. Nos. 3,924,043 and 3,924,044, both issued to Gobran et al., the disclosures of which are hereby incorporated by reference.

Thus, the mouse pad 20 has two layers. The first layer is a tracking surface 22 and the second layer is an adhesive layer 24 bonded to the lower surface 28 of the tracking surface 22.

The low-tack adhesive 34 of the adhesive layer 24 has a high degree of inherent tackiness. Preferably, the adhesive 34 adheres to a surface, such as a desk or tabletop, without forming a permanent bond with the surface. Additionally, when the adhesive layer 24 loses its tackiness due to a build-up of dirt and/or debris, the adhesive strength or tackiness of the adhesive 34 may be restored by washing the adhesive 34 in water. Washing the adhesive 34 removes the dirt and debris from the adhesive 34, thereby restoring the adhesive properties of the adhesive 34.

Operation of the mouse pad 20 may be best understood by referring to FIG. 1. The mouse pad 20 may be releasably attached to a surface (not shown) by the adhesive layer 24. The adhesive layer 24 secures the mouse pad 20 to the surface such that a computer operator may operate the mouse 30 on the upper surface 26 of the mouse pad 20. The textured surface of the upper surface 26 provides a frictional rolling surface for the mouse 30 to ensure precise tracking of the mouse 30. The computer operator may selectively place the mouse pad 20 at a desired location near the computer. The adhesive layer 24 secures the mouse pad 20 in the desired location. Should the computer operator desire to place the mouse pad 20 in a different location, the computer operator would simply pull the mouse pad 20 from the first location and reattach the mouse pad 20 in a second more desirable location. As noted above, should the adhesive layer 24 lose its adhesive bond strength, the adhesive layer 24 may be simply washed with water to restore its original adhesive strength.

The previously described version of the present invention provides several advantages over mouse pads currently available. First, because the adhesive of the mouse pad is renewable, it has a longer useful life. Second, the mouse pad of the present invention is less expensive than those currently available because it does not require a substrate, such as a layer of foam. Finally, because a mouse pad formed in accordance with the present invention is manufactured without a substrate, it is simpler to manufacture. Thus, a mouse pad formed in accordance with the present invention is cheaper, has a longer useful life, and is simpler to manufacture than those currently available.

From the foregoing description, it may be seen that a mouse pad formed in accordance with the present invention incorporates many novel features and offers significant advantages over those currently available. While the presently preferred embodiment of the invention has been illustrated and described, it is to be understood that within the scope of the appended claims, various changes can be made therein without departing from the scope of the invention.

The embodiments of the invention in which an exclusive property or privilege is claimed are defined as follows:

1. A repositionable mouse pad for a computer, the mouse pad comprising:

(a) a first layer having a textured first side and a second side; and (b) an attachment layer, the attachment layer includes an adhesive side, the attachment layer being bonded to the second side of the first layer, such that the adhesive side faces outwardly away from the first layer, the adhesive side having a predetermined adhesive strength to permit the mouse pad to be releasably attached to a surface, the adhesive side being renewable to restore its adhesive strength by cleaning the adhesive side.

2. The mouse pad of claim 1, wherein the attachment layer is a layer of normally tacky and pressure sensitive adhesive.

3. The mouse pad of claim 2, wherein the adhesive strength may be restored by washing the adhesive in water to restore its tackiness.

4. The mouse pad of claim 3, further comprising a computer mouse operatively connected to the computer, the computer mouse having a ball disposed within the computer mouse, wherein the ball of the computer mouse rolls over the textured first side of the first layer for precise tracking of the computer mouse.

5. The mouse pad of claim 4, further comprising indicia attached to the first side of the first layer for displaying a message.

6. The mouse pad of claim 5, wherein the first layer is a flexible material.

7. A method of using a mouse pad for a computer having a computer mouse, the mouse pad including a first layer having a textured first side, a second side, and an attachment layer, the attachment layer includes an adhesive side, the attachment layer being bonded to the second side of the first layer, such that the adhesive side faces outwardly away from the first layer, the adhesive side having a predetermined adhesive strength, the method of using the mouse pad comprising the steps of:

(a) removably affixing the mouse pad to a surface by placing the adhesive side on the surface;

(b) placing the computer mouse on the first side of the mouse pad for the precise tracking of the computer mouse; and (c) separating the mouse pad from the surface by pulling upwardly on an edge of the mouse pad relative to the surface.

8. The method of using a mouse pad of claim 7, further comprising the step of reconditioning the adhesive side to restore its adhesive strength by cleaning the adhesive side.

9. The method of using a mouse pad of claim 8, wherein the adhesive strength may be restored by washing the adhesive in water to restore its tackiness.

* * * * *

UNITED STATES PATENT AND TRADEMARK OFFICE
CERTIFICATE OF CORRECTION

PATENT NO.    : 5,919,562
DATED         : July 6, 1999
INVENTOR(S)   : Donald Root It is certified that error appears in the above-identified patent and that said Letters Patent is hereby corrected as shown below:

<u>Title page, item [56],</u>
References Cited, U.S. Patent Documents "3,737,816    6/1973  Swasey................ 161/167" should read -- 3,737,816    6/1973  Honicke...................161/167 --

<u>Item [56],</u>
References Cited, U.S. Patent Documents "3,924,043    12/1975  Gorbran et al. .....................442/151" should read --3,924,043    12/1975  Gobran et al. ....................442/151 --

<u>Item [56],</u>
References Cited, U.S. Patent Documents, insert cited references:
| | | |
|---|---|---|
| 3,311,338 | 03/28/1967 | Culley |
| 3,922,464 | 11/25/1975 | Silver et al. |
| 3,924,044 | 12/02/1975 | Gobran et al. |
| 4,834,502 | 05/30/1989 | Bristol et al. |
| 5,149,051 | 09/22/1992 | Schriner |
| 5,217,781 | 06/08/1993 | Kuipers |
| 5,340,075 | 08/23/1994 | Schriner |
| 5,346,766 | 09/13/1994 | Otter et al. |
| 5,358,766 | 10/25/1994 | Field |
| 5,487,927 | 01/30/1996 | Rusincovitch, Jr. et al. |
| 5,556,061 | 09/17/1996 | Dickie |

Signed and Sealed this

Twenty-fifth Day of September, 2001

*Attest:*

*Attesting Officer*

NICHOLAS P. GODICI
*Acting Director of the United States Patent and Trademark Office*